No. 681,106. Patented Aug. 20, 1901.
S. H. COUP.
STEAMER.
(Application filed May 6, 1901.)
(No Model.)

Witnesses
Gladys L. Thompson

Inventor
Sadie H. Coup.
By Attorneys

UNITED STATES PATENT OFFICE.

SADIE H. COUP, OF AKRON, OHIO.

STEAMER.

SPECIFICATION forming part of Letters Patent No. 681,106, dated August 20, 1901.

Application filed May 6, 1901. Serial No. 59,006. (No model.)

*To all whom it may concern:*

Be it known that I, SADIE H. COUP, a citizen of the United States, residing at Akron, in the county of Summit and State of Ohio, have invented certain new and useful Improvements in Steamers; and I do hereby declare the following to be a full, clear, and exact description of the invention, such as will enable others skilled in the art to which it appertains to make and use the same.

This invention relates to steamers for cooking purposes, the object in view being to provide a simple, cheap, and efficient holder for various articles which will facilitate the placing of the same in a suitable boiler or kettle and the removal of such articles after being cooked.

One of the principal objects of the present invention is to provide a holder of the class described having means whereby the supply of steam to the articles being cooked may be regulated and the water, grease, &c., prevented from flowing over the top of the kettle upon the stove during the operation of cooking.

The holder or tray forming the subject-matter of this invention may be manufactured and placed on the market at a low price, and is especially adapted for cooking meats, vegetables, dumplings, puddings, and the like, enabling the same to be handled without danger of breaking or mashing the articles subjected to the action of the steam or hot water. The device is also adapted to be utilized in connection with any ordinary kettle or vessel which may be covered by the ordinary lid.

The body of the holder is perforated to allow the steam to pass upward and circulate freely around and through the articles placed thereon, and by an ingenious arrangement of central support the middle portion of the perforated body of the holder is equipped with what may be termed a "damper," by the adjustment of which the supply of steam may be regulated and the water prevented from boiling over.

With the above and other objects in view the invention consists in the novel construction, combination, and arrangement of parts hereinafter fully described, illustrated, and claimed.

Figure 1:
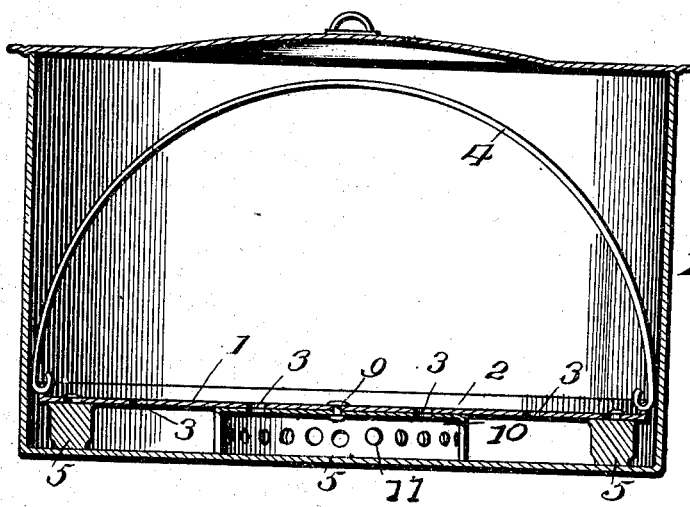
Figure 2:
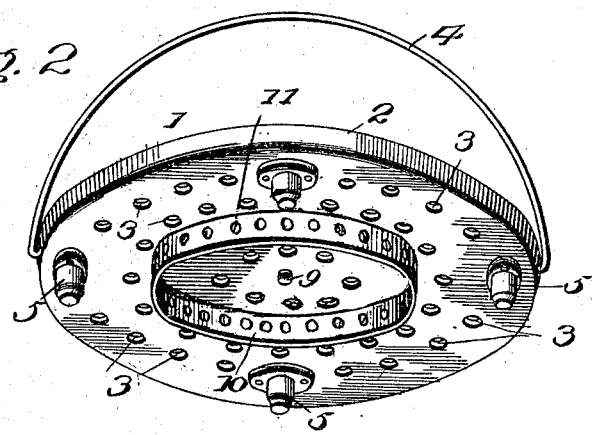
Figure 3:
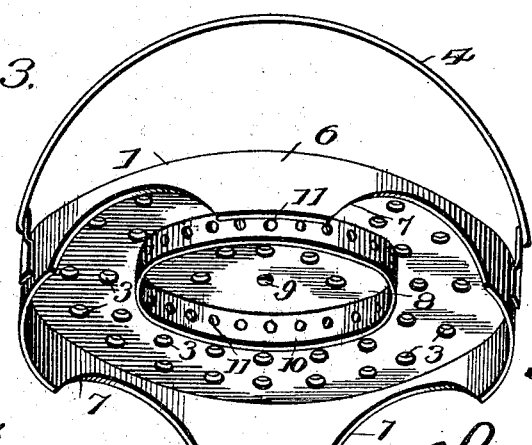

In the accompanying drawings, Figure 1 is a central vertical section through a vessel or boiler, showing the holder of this invention arranged therein. Fig. 2 is a bottom perspective view of the holder in its preferred form. Fig. 3 is a similar view showing a different construction of supporting-legs.

Similar numerals of reference designate corresponding parts in all figures of the drawings.

The holder contemplated in this invention comprises, essentially, a perforated body 1, which is preferably circular to correspond with the interior shape of the ordinary kettles or boilers and provided with an upstanding surrounding rim 2, thus giving to the device the shape of a tray, the body 1 forming the bottom of the tray for the support of the various articles to be cooked, and the rim 2 preventing such articles from falling off the tray during the process of cooking while subjected to the action of the steam or hot water and while removing the articles from the boiler or kettle after they have been cooked. The bottom 1 is provided with perforations 3, which are arranged in circular and concentric rows, as illustrated, and for a purpose which will hereinafter more clearly appear.

4 designate a bail-shaped handle, which has its end portions pivotally connected to the holder by passing the recurved and looped ends thereof through openings in the rim 2, as illustrated. The bail-shaped handle 4 is described in the same arc of a circle as the circumference of the rim 2, so that the handle may be folded downward after the holder is placed in the kettle or boiler, thereby allowing two or more of the holders to be inserted in the kettle or vessel and superimposed upon each other, thereby enabling different articles to be separated from each other while being simultaneously cooked.

The holder is provided with supporting-feet 5, extending downward and secured to the lower surface thereof, and these supporting-feet may either be in the form illustrated in Figs. 1 and 2, in which they are formed separately and secured in place by rivets or other suitable fasteners, or they may be formed, as shown in Fig. 3, by providing the tray with a depending annular flange 6, which is cut away at intervals, as shown at 7, to admit of the proper circulation of steam and hot water in the bottom of the boiler, the spaces between the notches or cut-away portions 7 forming the supporting-feet upon which the holder rests.

Arranged centrally of the bottom of the holder is a combined damper and supplemental support for the central portion of the holder. This combined damper and support comprises a disk-shaped body portion 8, formed from sheet metal and pivotally connected centrally to the center of the body or bottom 1 by means of a pivot 9, preferably in the form of a headed rivet. Said damper and support is also provided with a surrounding annular rim 10, adapted to rest against the bottom of the boiler or vessel in which the holder is placed, so as to form an efficient support for the central portion of the bottom 1, which might otherwise sag under the weight of the material placed thereon and allow the said bottom 1 to be bent out of shape, it being understood that the holder is ordinarily constructed of thin sheet metal for the sake of cheapness and lightness. In order to admit of the proper circulation of hot water and steam, the rim or flange 10 is provided with vent-openings 11, while the body portion 8 of the damper and support is provided with one or more circular series of openings 12, adapted to register with corresponding openings in the bottom 1 or to be thrown out of alinement therewith for the purpose of regulating the steam or hot water which passes upward through the center of the holder. It is for the purpose of enabling the openings in the damper and bottom or body of the holder to be brought into alinement that the said openings are formed in concentric series. The row or rows of openings in the damper are therefore described on the same radius as the corresponding row or rows of openings in the body 1, and thus by partially turning the part 8 preparatory to introducing the same into the kettle or boiler the circulation of steam and hot water may be primarily regulated according to the nature of the articles to be cooked or the condition of the fire and the rapidity of the generation of the steam. The rivet 9, which forms the pivotal connection between the combined damper and auxiliary support and the bottom or body of the holder, is by preference made tight, so that considerable force will have to be applied to the damper in order to partially turn the same, thereby preventing the damper from turning accidentally after it has been adjusted.

The steaming appliance hereinabove described is exceedingly simple in construction, may be produced at small cost, and is admirably adapted for cooking meats, vegetables, dumplings, puddings, and the like, adapting the same to be strained as they are removed from the cooking vessel and preventing injury thereto, which often occurs while lifting such articles from the boiler by means of the usual culinary appliances. The device is also adapted to be used in any ordinary kettle, boiler, or similar vessel, and will not interfere with the placing of the usual lid or cover on such vessel. The arrangement of openings in the body of the holder and the damper also serves to break up the steam and prevent the hot water from rising so rapidly as to overflow the top of the vessel.

Having thus described the invention, what is claimed as new, and desired to be secured by Letters Patent, is—

A steam cooking appliance consisting of a holder adapted to be placed in a boiler and comprising a perforated bottom with an upstanding rim, supporting-feet depending from the lower side of the bottom, a bail-shaped handle pivotally connected with the rim, and a combined damper and supplemental support for the bottom of the holder, pivotally united to the lower side of the bottom and provided with openings adapted to be moved into and out of alinement with corresponding openings in the bottom, said damper and supplemental support having a pendent rim provided with circulation-openings, substantially as and for the purpose set forth.

In testimony whereof I affix my signature in presence of two witnesses.

SADIE H. COUP. [L. S.]

Witnesses:
ELLA C. HILTON,
H. O. FEEDERLE.